(12) United States Patent
Morris (10) Patent No.: US 10,371,291 B2
(45) Date of Patent: Aug. 6, 2019

(54) VALVE PACKAGE SUPPORTS AND METHOD OF MANUFACTURE

(71) Applicant: Johnson Controls Technology Company, Holland, MI (US)

(72) Inventor: Jeremy S. Morris, Ruskin, FL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 148 days.

(21) Appl. No.: 15/213,138

(22) Filed: Jul. 18, 2016

(65) Prior Publication Data

US 2018/0017188 A1   Jan. 18, 2018

(51) Int. Cl.
| | |
|---|---|
| *F16L 3/08* | (2006.01) |
| *F16L 3/12* | (2006.01) |
| *F16M 13/02* | (2006.01) |
| *B21D 5/16* | (2006.01) |

(52) U.S. Cl.
CPC .............. *F16L 3/1222* (2013.01); *B21D 5/16* (2013.01); *F16M 13/02* (2013.01)

(58) Field of Classification Search
CPC ........... F16L 3/1222; F16L 3/08; F16M 13/02
USPC ....... 248/674, 58, 65, 68.1, 49, 67.5, 70, 72, 248/73, 74.2, 316.1, 316.2, 300; 62/298
See application file for complete search history.

(56) References Cited

U.S. PATENT DOCUMENTS

| | | | | |
|---|---|---|---|---|
| 2,404,531 A * | 7/1946 | Robertson | ............. | F16L 3/2235 138/106 |
| 2,534,690 A * | 12/1950 | Young, Jr. | ............... | F16L 3/227 248/68.1 |
| 2,542,442 A * | 2/1951 | Weber | ...................... | F16L 3/223 248/68.1 |
| 2,661,483 A * | 12/1953 | Tortorice | ................ | E03C 1/021 248/57 |
| 2,745,199 A * | 5/1956 | Kreinberg | ............... | G09F 11/29 248/68.1 |
| 3,582,029 A * | 6/1971 | Moesta | .................... | F16L 3/222 248/300 |
| 4,550,451 A * | 11/1985 | Hubbard | ................. | E03C 1/021 248/56 |
| 4,907,766 A * | 3/1990 | Rinderer | ................... | F16L 3/22 248/57 |
| 5,050,824 A * | 9/1991 | Hubbard | ................... | F16L 3/24 248/57 |
| 5,082,234 A * | 1/1992 | Smith | .................. | B23Q 9/0064 248/291.1 |
| 5,098,047 A * | 3/1992 | Plumley | ................ | F16L 3/2235 248/68.1 |
| 5,205,520 A * | 4/1993 | Walker | .................. | F16L 3/2235 248/68.1 |
| 6,357,247 B1 * | 3/2002 | Moretti | .................... | F24F 1/027 62/262 |
| 6,540,531 B2 * | 4/2003 | Syed | .................... | H01R 9/0524 174/68.3 |
| 6,758,300 B2 * | 7/2004 | Kromis | .................. | B60K 13/04 180/296 |
| 6,951,324 B2 | 10/2005 | Karamanos | | |
| 7,140,236 B2 | 11/2006 | Karamanos | | |
| 7,387,013 B2 | 6/2008 | Karamanos | | |

(Continued)

*Primary Examiner* — Terrell L McKinnon
*Assistant Examiner* — Michael McDuffie
(74) *Attorney, Agent, or Firm* — Fletcher Yoder, P.C.

(57) ABSTRACT

A support that includes an exterior shell having a section configured to receive an item and a filler disposed within the exterior shell, wherein the filler is further configured to receive the item.

20 Claims, 6 Drawing Sheets

(56) References Cited

U.S. PATENT DOCUMENTS

| | | | |
|---|---|---|---|
| 7,444,731 B2 | 11/2008 | Karamanos | |
| 7,478,761 B2 | 1/2009 | Karamanos et al. | |
| 7,520,474 B1 * | 4/2009 | Condon | F16L 3/223 |
| | | | 248/300 |
| 7,596,962 B2 | 10/2009 | Karamanos | |
| 7,823,846 B2 * | 11/2010 | Williams, III | H02G 3/0493 |
| | | | 248/200.1 |
| 7,856,865 B2 | 12/2010 | Karamanos | |
| 7,937,820 B2 | 5/2011 | Karamanos | |
| 8,146,377 B2 | 4/2012 | Karamanos | |
| 8,267,357 B2 * | 9/2012 | Kataoka | H02G 3/088 |
| | | | 174/135 |
| 9,731,156 B2 * | 8/2017 | Jung | A62C 35/68 |
| 2002/0104942 A1 * | 8/2002 | Mimlitch, III | H05K 7/186 |
| | | | 248/300 |
| 2009/0173844 A1 * | 7/2009 | Huo | H02G 3/32 |
| | | | 248/65 |
| 2015/0021446 A1 * | 1/2015 | Korcz | F16L 3/1215 |
| | | | 248/58 |

* cited by examiner

VALVE PACKAGE SUPPORTS AND METHOD OF MANUFACTURE

TECHNICAL FIELD

The present disclosure relates generally to heating, ventilation and air conditioning (HVAC) systems, and more specifically to valve package supports that prevent metal to metal contact between the supports and associated piping.

BACKGROUND OF THE INVENTION

Modular HVAC components simplify the installation of HVAC systems, but complex assemblies can be damaged during shipment.

SUMMARY OF THE INVENTION

A valve package support and method of fabrication are disclosed. The support includes an exterior shell having a section configured to receive an item and a filler disposed within the exterior shell, wherein the filler is further configured to receive the item.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures might not be to scale and certain components can be shown in generalized or schematic form and identified by commercial designations in the interest of clarity and conciseness.

Figure 1:
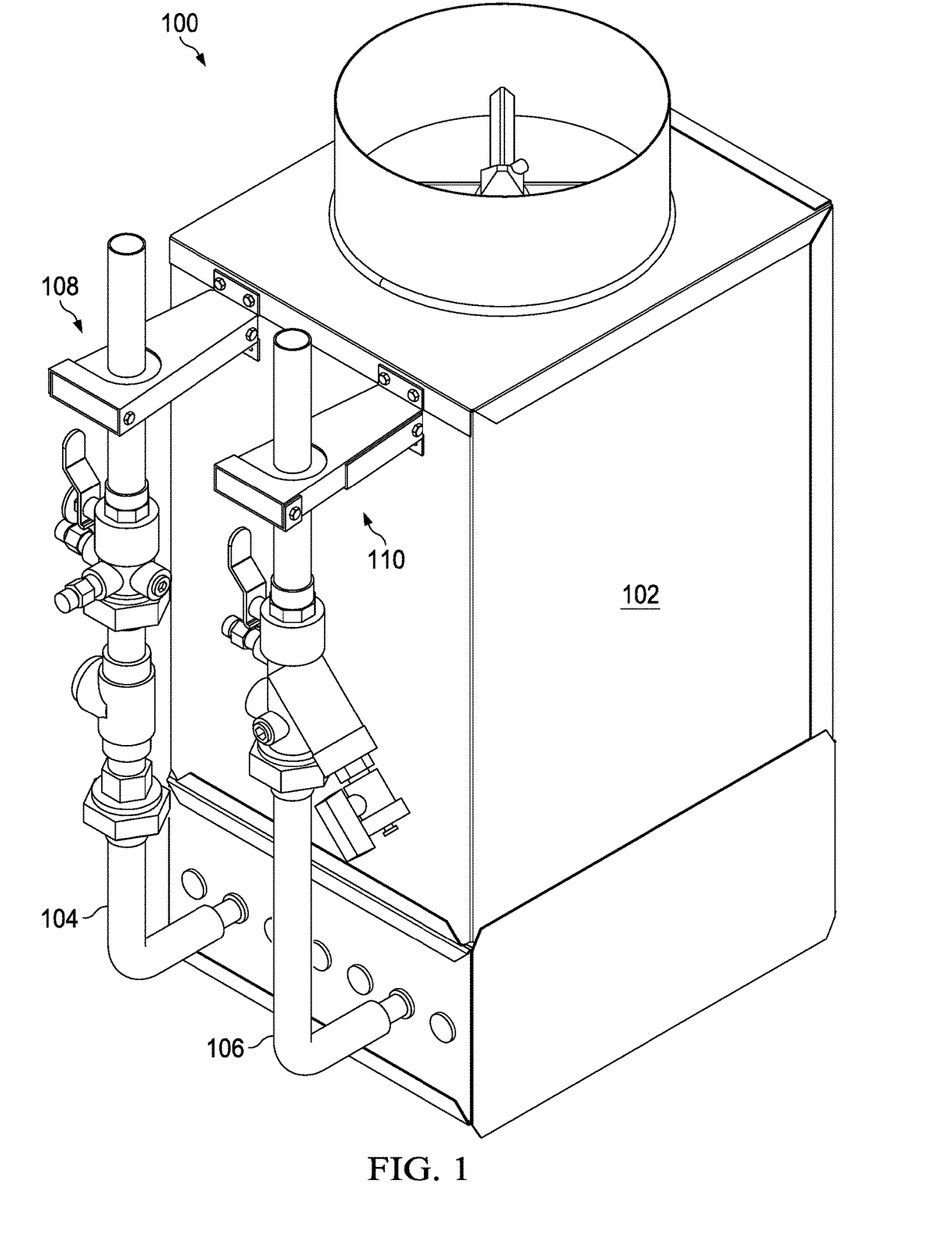
FIG. 1 is an isometric view of valve package supports as installed on a modular HVAC assembly, in accordance with an exemplary embodiment of the present disclosure.

FIG. 1 is an isometric view of valve package supports 108 and 110 as installed on a modular HVAC assembly 100, in accordance with an exemplary embodiment of the present disclosure. Valve package supports 108 and 110 are used to support pipe assemblies 104 and 106, respectively, which are used to control the flow of water or other liquids to a modular cooling coil assembly 102 for an HVAC system, but can be used in other suitable locations or for other suitable purposes, such as to support pipes, pipe assemblies, conduit, flexible metallic tubing, coolant lines, drain lines, polyvinyl chloride tubing, metallic or non-metallic structures or other suitable items.

In one exemplary embodiment, modular HVAC assembly 100 is assembled in a factory for subsequent shipment to a field location. The shipping typically occurs by truck or in other manners that can result in rough handling, such that pipe assemblies 104 and 106 will experience vibration or other forces. Valve package supports 108 and 110 can be factory mounted, so as to be used to immobilize pipe assemblies 104 and 106 during shipment and also as installed in the field during operation, to dampen such vibration or other potentially damaging forces while avoiding the potential for metal-on-metal contact with pipe assemblies 104 and 106, which are typically fabricated from softer metals, such as copper, that can be damaged by metal-on-metal contact with a support.

Figure 2:
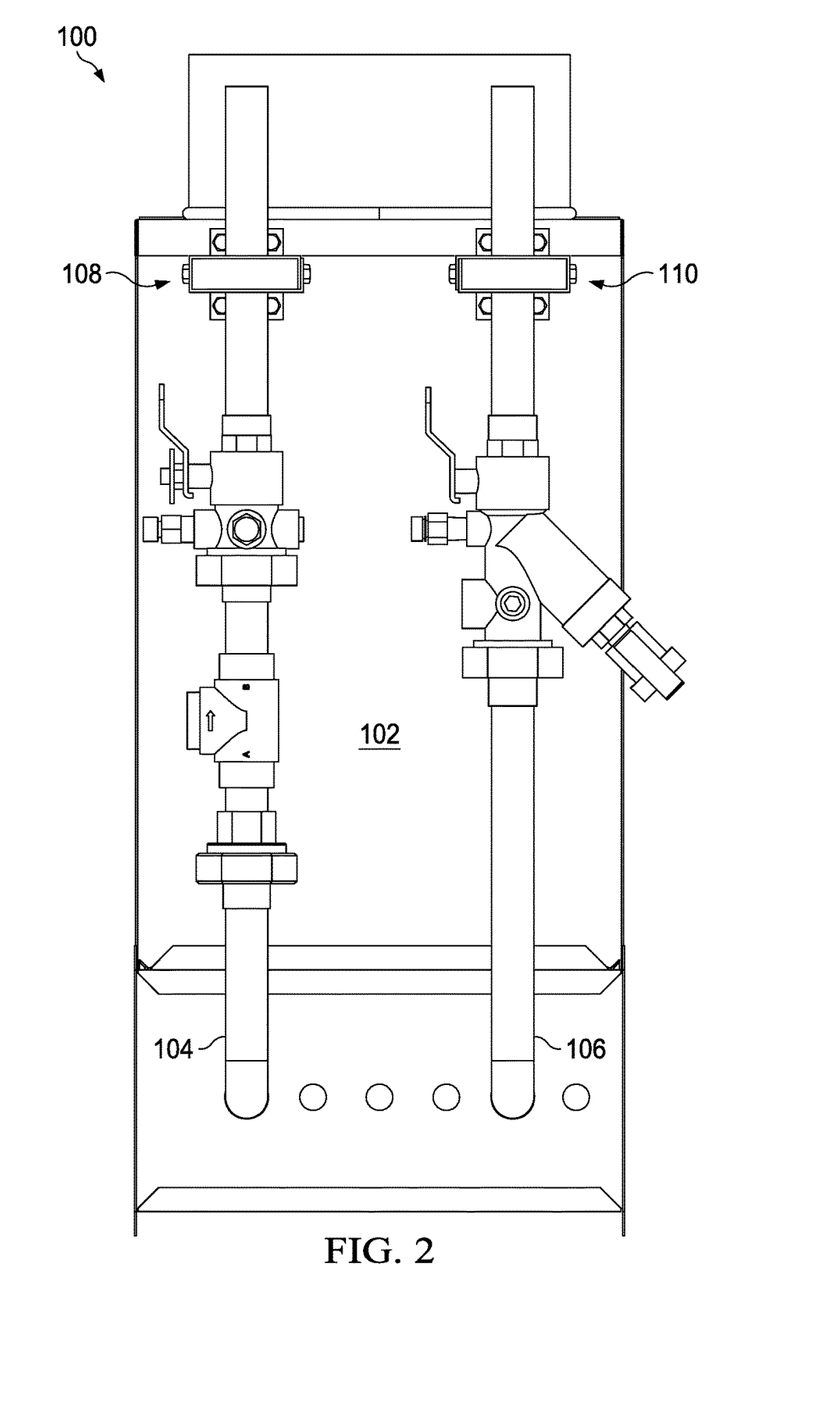
FIG. 2 is a front view of valve package supports as installed on a modular HVAC assembly, in accordance with an exemplary embodiment of the present disclosure.

FIG. 2 is a front view of valve package supports 108 and 110 as installed on a modular HVAC assembly 100, in accordance with an exemplary embodiment of the present disclosure. As can be seen in FIG. 2, the valve package supports 108 and 110 have a low profile and do not extend beyond the other components of pipe assemblies 104 and 106, so as not to interfere with handling or field assembly.

Figure 3:
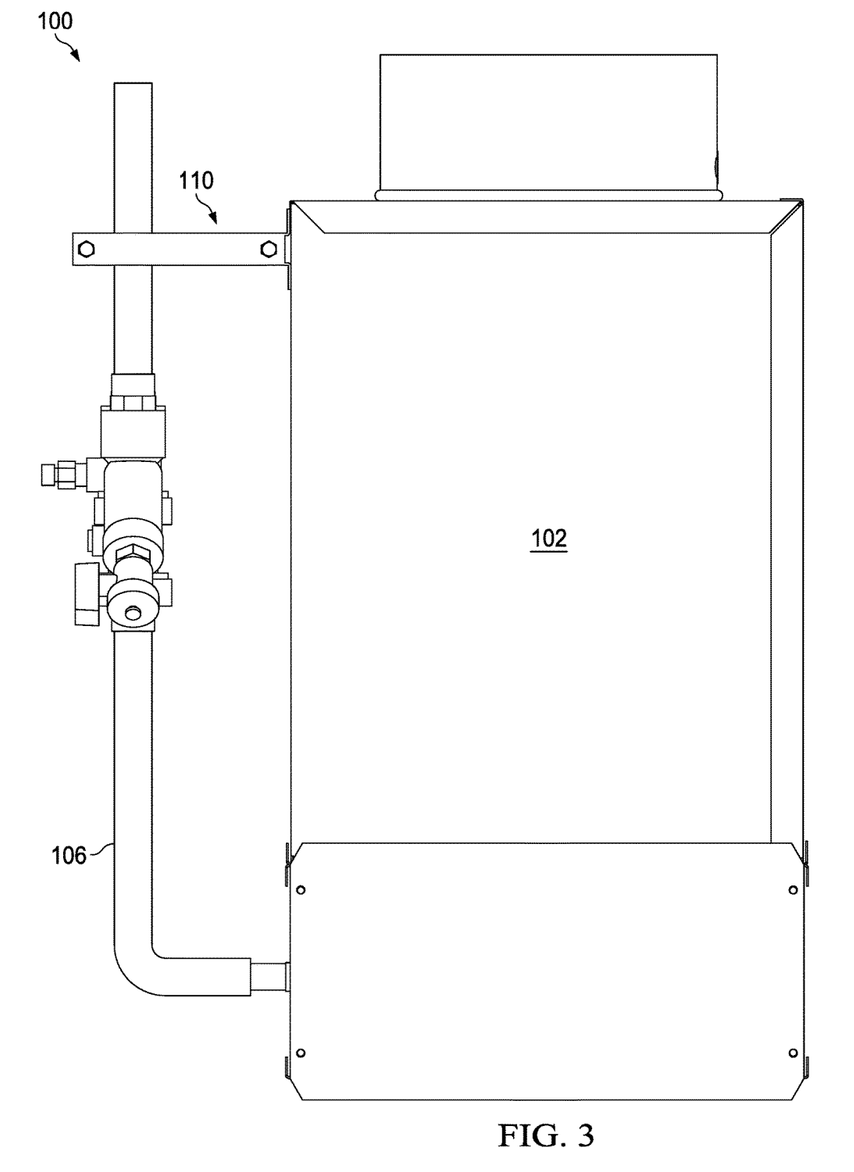
FIG. 3 is a side view of valve package supports as installed on a modular HVAC assembly, in accordance with an exemplary embodiment of the present disclosure.

FIG. 3 is a side view of valve package supports 108 and 110 as installed on a modular HVAC assembly 100, in accordance with an exemplary embodiment of the present disclosure. The low profile of valve package supports 108 and 110 can also be seen in FIG. 3. Valve package supports 108 and 110 can be fabricated with any suitable dimensions, such as to support pipe assembly 106 closer to or farther away from modular cooling coil assembly 102, to support larger or smaller pipe assemblies, or in other suitable manners.

Figure 4:
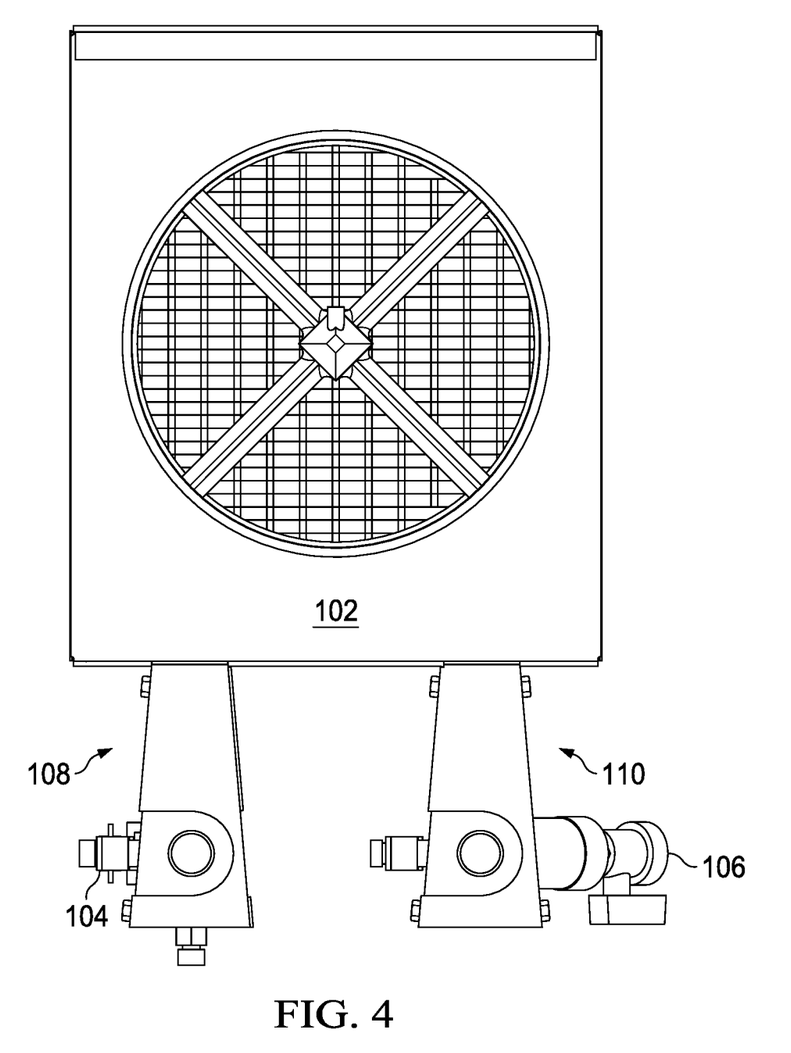
FIG. 4 is an overhead view of valve package supports as installed on a modular HVAC assembly, in accordance with an exemplary embodiment of the present disclosure.

FIG. 4 is an overhead view of valve package supports 108 and 110 as installed on a modular HVAC assembly 100, in accordance with an exemplary embodiment of the present disclosure. The low profile of valve package supports 108 and 110 can also be seen in FIG. 4. Valve package supports 108 and 110 as shown include a non-rectangular outer periphery, but can be fabricated with any suitable dimensions, such as with a rectangular, square or irregular periphery, or as otherwise needed, such as to support pipe assembly 106 closer to or farther away from modular cooling coil assembly 102, to support larger or smaller pipe assemblies, or in other suitable manners.

Figure 5:
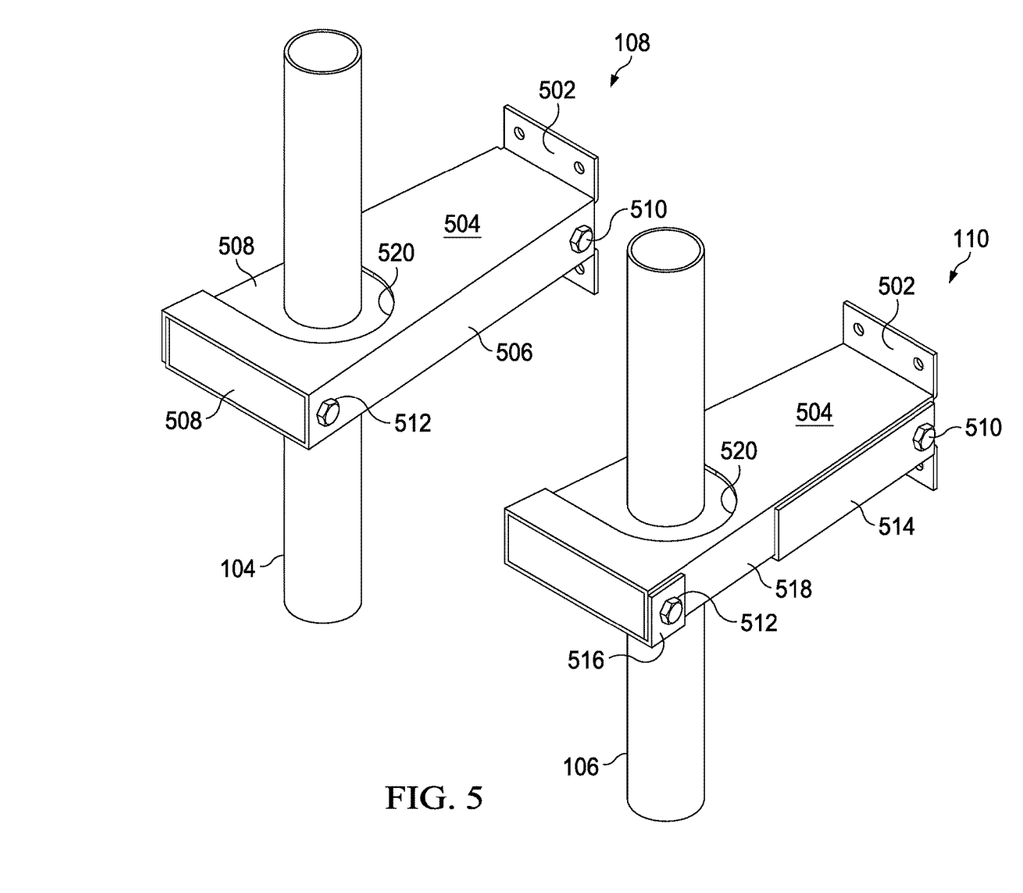
FIG. 5 is an isometric view of valve package supports, in accordance with an exemplary embodiment of the present disclosure.

FIG. 5 is an isometric view of valve package supports 108 and 110, in accordance with an exemplary embodiment of the present disclosure. Each valve package support 108 and 110 includes a base 502, an upper surface 504 and corresponding lower surface, side surfaces 506 and 518, assembly bolts 510 and 512, assembly tabs 514 and 516, support material 508 and section 520.

Base 502 can be formed from metal or other suitable materials as part of a single piece of sheet metal that is used to form valve package supports 108 and 110, or can be other suitable structures or components. Base 502 includes a number of holes (four in the exemplary embodiment as shown) for bolting base 502 to a suitable support structure, but base 502 can also or alternatively be welded, riveted, glued or otherwise suitably secured to a support structure or other suitable structure.

Upper surface 504 and the corresponding lower surface can be formed from metal or other suitable materials as part of a single piece of sheet metal that is used to form valve package supports 108 and 110, or can be other suitable structures or components. Although the corresponding lower surface is not shown, it can have the same shape as upper surface 504, or other suitable shapes. In one exemplary embodiment, upper surface 504 and the corresponding lower surface can be formed by folding a sheet metal work piece that has been cut from sheet metal using a punch, shears, lasers, saws or in other suitable manners, and where the work piece has been cut to match a die, template, computer aided manufacturing (CAM) model or other suitable design tools. The work piece can be folded to form a polytope, polyhedron, convex polyhedron, cuboid, rhombohedron, parallelepiped, trapezohedron, quadrilateral frustum, irregular hexahedron or other suitable shapes or structures. Likewise, upper surface 504 and the corresponding lower surface can be formed by injection molding, casting or in other suitable manners. Section 520 can be cut or otherwise formed in upper surface 504 and the corresponding lower side surface, and the side opposite sides 506 and 518 can also form a portion of section 508. In the exemplary embodiment shown, section 520 includes a semicircular portion and a slot portion, where the slot portion has a width equal to the diameter of the semicircular portion, but the slot portion can also or alternatively have other suitable dimensions, such as a narrower throat portion that is marginally larger than the diameter of the pipe or tubing that will be included within section 520, a square or rectangular shape or other suitable shapes.

Side surfaces 506 and 518 can also be formed by folding a sheet metal work item or in other suitable manners. Assembly bolts 510 and 512 can be used to hold assembly tabs 514 and 516 in position, or for other suitable purposes. Likewise, the work item can be welded, epoxied, sealed, molded, extruded or formed in other suitable manners, so that bolts 510 and 512 can be eliminated.

Support material 508 is used to fill the interior of valve package supports 108 and 110, and can be formed from non-metallic foam, elastomers, rubbers, polymers or other suitable materials. In one exemplary embodiment, support material 508 can be cut from a block of raw material using a suitable process, can be formed by injection molding or compression molding, or can be formed in other suitable manners. Support material 508 can be cut or otherwise formed to include a hole for pipe assemblies 104 and 106, can include a slit or other suitable device that is located within section 520 to allow support material 508 to be installed around pipe assemblies 104 and 106, or can include other suitable features.

In operation, valve package supports 108 and 110 can be formed using an assembly line or other suitable processes, such as where a work item is first formed from sheet metal, and where the support material is formed from a suitable non-metallic material in parallel with the fabrication of the work item. The support material can then be placed on the work item, which can be folded around the support material to form a valve package support, and bolts or other suitable connecting devices or processes can be used to secure the assembly of valve package supports 108 and 110. The pipe can then be inserted into section 520 through the slit or in other suitable manners. Alternatively, the support material can be injected or extruded into the valve package support after it has been fabricated, can be injected or extruded into the valve package support after it has been placed around the pipe or other structure that it is supporting, or can be assembled in other suitable manners.

Figure 6:
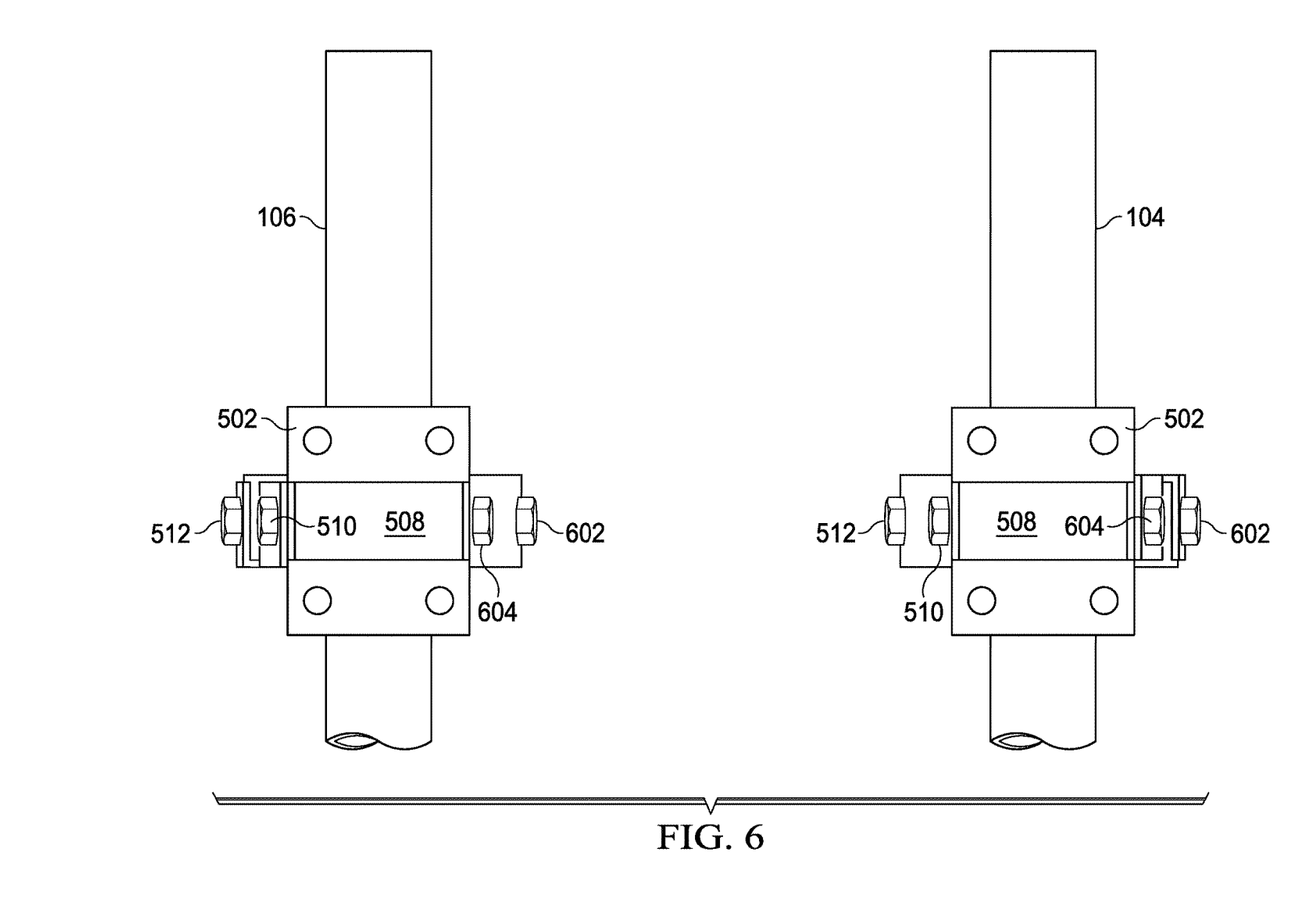
FIG. 6 is a rear view of valve package supports, in accordance with an exemplary embodiment of the present disclosure.

FIG. 6 is a rear view of valve package supports 108 and 110, in accordance with an exemplary embodiment of the present disclosure. As shown in FIG. 6, base 502 is formed by two tabs that can be cut from sheet metal with the other exterior components of valve package supports 198 and 110, which can then be folded into position as shown. Bolts 510, 512, 602 and 604 can be used to secure the exterior components of valve package supports 108 and 110, can be used to secure support material 508 into position, can be replaced with a single bolt that extends from one side of valve package supports 108 and 110 to the other side, or can otherwise be used to assemble and secure valve package supports 108 and 110. Likewise, welding, rivets, epoxy, bonding or other suitable connecting mechanisms can also or alternatively be used.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A support, comprising:
   an exterior shell defined by a top surface, a bottom surface, a first side surface, and a second side surface, wherein the exterior shell comprises an assembly tab extending cross-wise from the bottom surface and configured to couple to the second side surface, wherein the exterior shell is a single piece component, wherein the exterior shell comprises a section configured to receive an item, wherein the section is formed within the top surface, the bottom surface, and the first side surface; and
   a filler comprising a first portion disposed within a cavity of the exterior shell and a second portion disposed in the section and external to the cavity, wherein the second portion of the filler is further configured to receive the item, and wherein the second side surface is disposed between the filler and the assembly tab.

2. The support of claim 1, wherein the exterior shell is formed from sheet metal and is folded into a hollow polyhedron.

3. The support of claim 1, wherein the section comprises a slot.

4. The support of claim 3, wherein the section further comprises a semicircular portion.

5. The support of claim 1, wherein the filler comprises a non-metallic material.

6. The support of claim 1, wherein the exterior shell comprises a base configured to be secured to a support structure, wherein the base comprises a tab extending cross-wise to the top surface.

7. The support of claim 1, further comprising a component of a heating, ventilation, and air conditioning (HVAC) system, wherein the component comprises one or more pipe structures, and wherein the support is configured to prevent damage to the one or more pipe structures during shipment.

8. The support of claim 4, wherein the slot is within the top surface, and wherein the slot extends from the semicircular portion to an edge of the top surface.

9. The support of claim 1, comprising a connecting mechanism configured to couple the assembly tab to the second side surface, wherein the connecting mechanism extends through the assembly tab, through the second side surface, and into the filler.

10. A support, comprising:
an exterior shell defined by a top surface, a bottom surface, a first side surface, and a second side surface, wherein the exterior shell is a single piece component, wherein the exterior shell comprises a base having a tab configured to couple to a support structure, wherein the tab extends cross-wise to the top surface, wherein the exterior shell comprises a section configured to receive an item, wherein the section is formed within the top surface, the bottom surface, and the first side surface; and
a filler comprising a first portion disposed within a cavity of the exterior shell and a second portion disposed in the section and external to the cavity, wherein the second portion of the filler is further configured to receive the item.

11. The support of claim 10, comprising an aperture formed within the tab, wherein the aperture is configured to receive a bolt configured to couple the base to the support structure.

12. The support of claim 10, wherein the section comprises a slot within the top surface, wherein the slot includes a semicircular portion.

13. The support of claim 12, wherein the slot extends from the semicircular portion to an edge of the top surface.

14. The support of claim 10, wherein the filler comprises non-metallic foam or rubber.

15. A support, comprising:
an exterior shell defined by a top surface, a bottom surface, a first side surface, and a second side surface, wherein the exterior shell is a single piece component that is formed from sheet metal and is folded into a hollow polyhedron, wherein the exterior shell comprises a section configured to receive an item, wherein the section is formed within the top surface, the bottom surface, and the first side surface; and
a filler comprising a first portion disposed within a cavity of the exterior shell and a second portion disposed in the section and external to the cavity, wherein the second portion of the filler is further configured to receive the item.

16. The support of claim 15, wherein the exterior shell comprises a first tab that extends cross-wise from the top surface and a second tab that extends cross-wise from the bottom surface.

17. The support of claim 16, wherein the first tab extends from the top surface in a first direction and the second tab extends from the bottom surface in a second direction opposite to the first direction.

18. The support of claim 15, wherein the exterior shell comprises an assembly tab extending cross-wise from the bottom surface and configured to couple to the second side surface.

19. The support of claim 18, wherein the second side surface is positioned between the filler and the assembly tab.

20. The support of claim 15, wherein the filler is rubber.

* * * * *